Feb. 20, 1968 T. A. ARMAO 3,369,549
CAPSULE PROBE HAVING THERMOELECTRIC HEAT EXCHANGE MEANS THEREIN
Filed Oct. 5, 1965 3 Sheets-Sheet 1
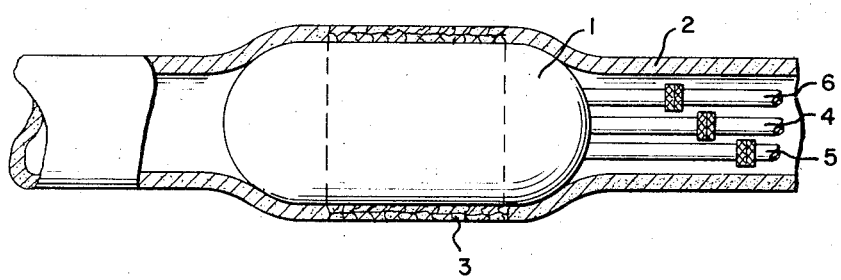
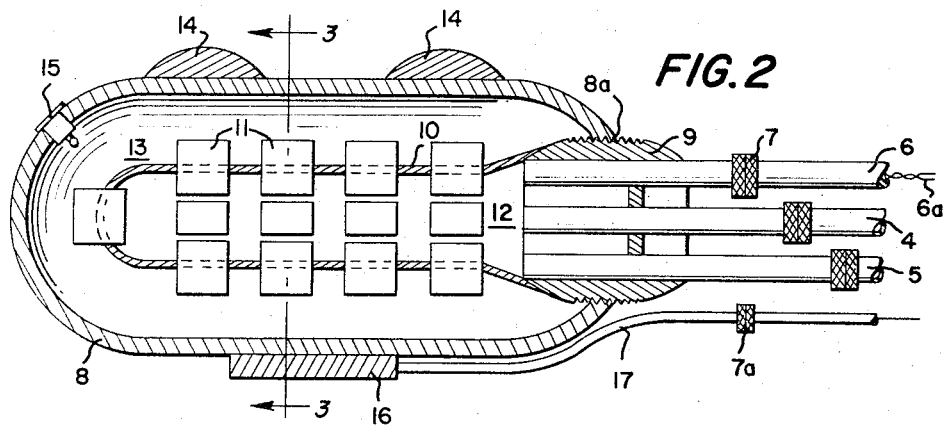
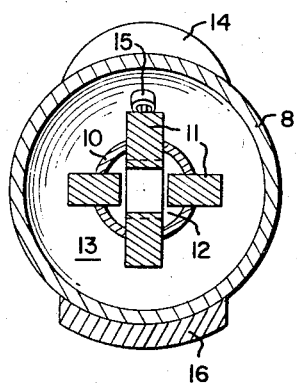
INVENTOR
THOMAS A. ARMAO
ATTORNEYS

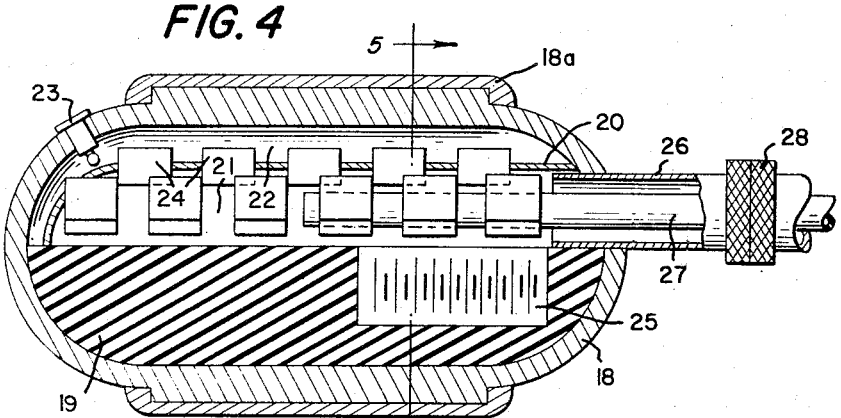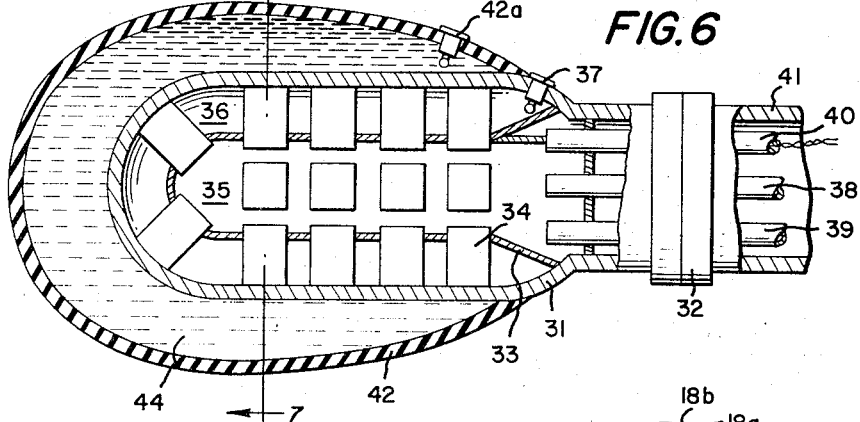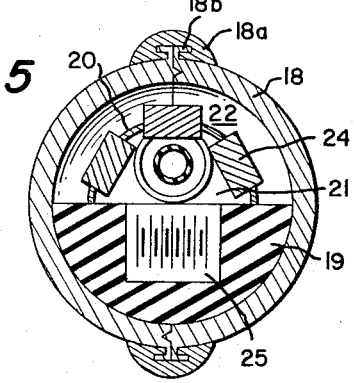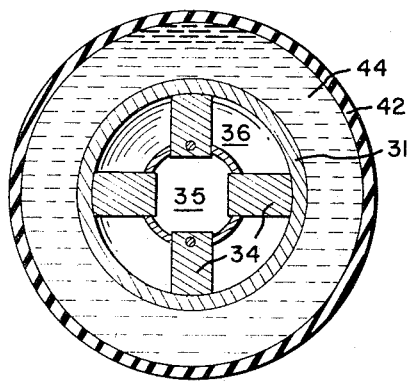

Feb. 20, 1968 T. A. ARMAO 3,369,549
CAPSULE PROBE HAVING THERMOELECTRIC HEAT EXCHANGE MEANS THEREIN
Filed Oct. 5, 1965 3 Sheets-Sheet 3

INVENTOR
THOMAS A. ARMAO

BY Wenderoth, Lind & Ponack

ATTORNEYS

United States Patent Office 3,369,549
Patented Feb. 20, 1968

3,369,549
CAPSULE PROBE HAVING THERMOELECTRIC
HEAT EXCHANGE MEANS THEREIN
Thomas A. Armao, 1242 56th St.,
Brooklyn, N.Y. 11219
Filed Oct. 5, 1965, Ser. No. 493,012
9 Claims. (Cl. 128—303.1)

This invention relates to an instrument for use in either cryogenic or thermal treatment of the human body, and more particularly to a capsule of such size as to permit its introduction into ducts, lumens and cavities of an animal or human body for the treatment of the viable tissue thereof, and which capsule has thermoelectric heat exchange means therein.

In the surgical treatment of diseases of the colon or large intestine, particularly cancers thereof, it is frequently necessary to dissect out and remove a portion of the colon. If a malignancy is present, this dissection can result in the metastasing or release of malignant cells into healthy tissue. This metastasizing can be avoided, however, if the diseased portion of the intereistine is cooled or frozen prior to cutting. Cooling of the diseased portion of the intestine causes stasis of the area, thereby rendering the malignant cells immobile by inhibiting the activity and movement of fluids and cells in the tissue and thus preventing spread of the malignancy. While cooling to a degree of stasis is ordinarily sufficient, it is possible to actually freeze the afflicated tissue much below zero degrees centigrade, thereby rendering it harmless for a prolonged period of time. Freezing at sufficiently low temperatures will destroy cancer cells but it is doubtful whether it can destroy cancer viruses if such exist within a cell. It does, however, render the tissue hard and immobile and it reduces to an absolute minimum the danger of spillage of malignant cells into healthy tissue.

In other situations as in the non-surgical treatment of cancer, it has been discovered that heat applied to malignant tissue, while the general body temperature is dropped below the norm of 98.6, will lead to a regression of the tumor mass thus contacted. In such cases, it is also important that the surgical device or instrument in contact with the tumor not pulsate or agitate the area being heat treated. The inherent danger of a pulsating instrument in contact with a malignancy is the propulsion of cancer cells into healthy tissue. The only way to reach such a tumor without cutting the body open is through the ducts, lumens and cavities of the body.

There are also many other situations not involving malignancies in which it is beneficial to apply heat or cold to various parts of the interior of the body and where it is desirable to do so either without surgery, or in conjunction with surgery.

It is an object of the present invention to provide a capsule probe which can be introducued into the body through the various ducts, lumens and cavities therein, and which can apply either heat or cold, or can apply heat and cold successively to the body.

It is a further object of the invention to provide a capsule probe of this type which is simple to use and has a minmium of auxiliary equipment which must be connected with it to control the amount and degree of heat and cold which is applied.

The capsule probe according to the present invention comprises a capsule which has substantially rigid walls and has blunt forward and rear ends, and is of a heat transmitting material. Within the capsule is a thermoelectric component which when it is supplied with current will either heat or cool the walls of the capsule, depending on the direction in which the current is passed through it. The capsule has attached to it trailing tubes which acts as conduits to supply direct electric current and a heat transfer medium for heat supply to or removal from the thermoelectric components contained in the capsule. Thus the capsule walls can be selectively cooled or heated to any desired degree.

The invention will be described in greater particularity in the following specification, taken together with the accompanying drawings, in which:

FIG. 1 is an elevation view of the capsule according to the invention in position in a body conduit, the body conduit being shown in section;

FIG. 2 is a sectional elevation view of the capsule according to the invention;

FIG. 3 is a sectional view taken on line 3—3 of FIG. 2;

FIG. 4 is a sectional elevation view of a modified form of capsule according to the present invention;

FIG. 5 is a sectional view taken on line 5—5 of FIG. 4;

FIG. 6 is a sectional elevation view of another modified form of capsule according to the present invention;

FIG. 7 is a sectional view taken on line 7—7 of FIG. 6;

Figure 8:
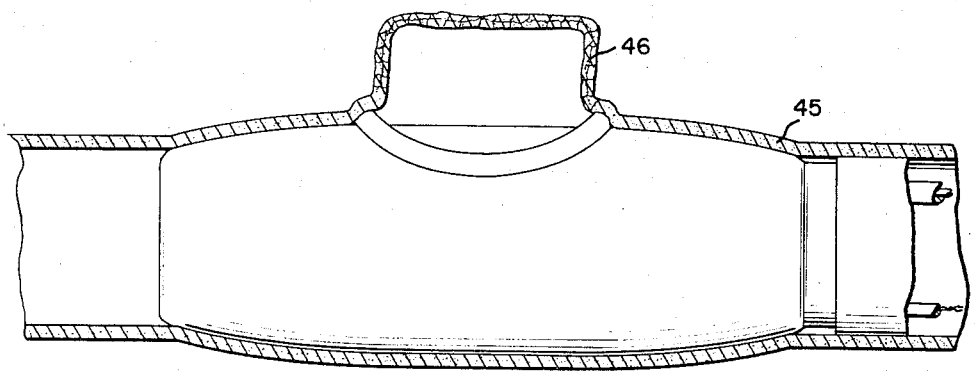
FIG. 8 is an elevation view of a form of the capsule which is a hollow cylinder, the capsule being shown in a body conduit with the conduit in section.

As seen in FIG. 1, the capsule 1 is positioned within a body conduit 2, such as the colon, which has a malignant area or portion 3. The capsule has blunt forward and rear ends which enable it to be forced along the body conduit 2 to the proper position for application of heat or cold to the body conduit 2. Attached to the rear end of the capsule 1 by quick disconnect couplings 7 are conduits 4, 5 and 6 which conduct heat exchange medium and electric current to the capsule 1.

The capsule 1 as seen in FIG. 2 consists of an outer casing 8 of a heat conducting material, such as metal, which has a screw threaded opening 8a at the rear end thereof. Orientation bumps 14 are shown on the exterior surface of the casing 8 for enabling the surgeon to locate the capsule within the body conduit.

Threaded into the threaded opening 8a is a closure member 9 which has mounted thereon a closed end cylindrical shell 10 projecting into the interior of the casing 8 and which is preferably of a heat insulating material. Mounted in the shell 10 are a plurality of thermocouples 11 of the type which when a direct current is passed through them get hot on one end and cold on the other end. As example of such thermocouples are bismuth telluride thermocouples doped at the junctions to give them refrigerating properties and covered with an electrically resistant heat transmitting insulation. The thermocouples 11 are mounted in the shell 10 with one end outside of the shell and the other end inside the shell and are electrically connected in series. With the shell 10 mounted on the closure member 9, the interior of the shell 10 is separated from the exterior thereof, so that there is a closed space 12 within the shell 10 and a further closed space 13 between the shell 10 and the casing 8. A valved opening 15 in the casing 8 is provided in order to supply a heat conducting fluid to the closed space 13.

Opening through the closure member 9 is a plurality of conduits 4, 5 and 6, the conduits 4 and being insulated supply and return conduits for conducting a heat transfer medium into and out of the space 12 within the shell 10, and the conduit 6 being a conduit for two wires 6a which are connected to the thermocouples 11 for supplying current thereto. Quick disconnect couplings 7 are provided in each conduit.

A temperature sensing thermocouple 16 is positioned on the casing 8, here being shown on the outside of the casing, and a conduit 17 has therein the thermocouple wires which lead to a temperature recording device (not shown). A quick disconnect coupling 7a is also provided in the conduit 17.

In use, the closure member 9 is first threaded into the casing 8, which has previously been sterilized, and the conduits 4, 5, 6 and 17 are connected to the couplings 7 and 7a. The space 13 is then filled with a heat transfer fluid through the valved opening 15, and the device is then ready for use. It is inserted into the body conduit, such as the body conduit 2 of FIG. 1, and worked along the conduit by applying a force to the conduits 4, 5, and 6, until it reaches the desired location. If the device is used on a patient who is in surgery, the surgeon can determine the correct location of the capsule in the body conduit by means of the bumps 14 on the casing 8. Otherwise, it may be possible to feel these bumps from outside the body of the patient, or from within another body conduit, lumen or body cavity. Alternatively, X-ray techniques can be used to locate the capsule within a body conduit.

A heat exchange medium is then circulated through the space 12 through the conduits 4 and 5, and a current is passed through the thermocouples 11 through the wires 6a in the conduit 6. If it is desired to cool the affected body part, the current is passed in a direction such that the portions of the thermocouples projecting into the space 13 are cold and the porions projecting into the space 12 are hot. In such an instance, the heat exchange medium circulated through the space 12 removes heat therefrom. Heat will then be transmitted from the affected body part, through the heat conductive material of the casing 8, through the heat conducting medium in the space 13, and will be effectively transferred through the thermocouples 11 into the heat transfer medium being circulated through the space 13. If it is desired to heat the affected body part, the reverse procedure is used. The current direction is the opposite from that for cooling, and the heat exchange medium must supply heat to the space 12. Heat will then effectively be transferred through the thermocouples to the heat conductive medium and through the casing 8 to the affected body part.

When the treatment is concluded, the capsule can either be withdrawn the way in which it was inserted, i.e. by a force on the conduits 4, 5 and 6, or through an incision in the body conduit, in which case the conduits 4, 5, 6 and 17 must be disconnected at the couplings 7 and 7a.

Because the shell 10 and the conduits 4, 5 and 6 are mounted in the closure member 9 which is separate from and threadable into the casing 8, it is not only possible to use a single assembly of thermocouples 11, shell 10 and conduits 4, 5 and 6 with a plurality of different sizes and shapes of casings 8, each of which has the same size opening 8a therein, but it is also possible to remove the entire thermocouple assembly to repair or replace thermocouples. In addition, sterilization problems can be avoided by making the casing 8 of an inexpensive material so that it can be discarded after use. Such casings can be supplied in prepackaged sterile units. Alternatively the casings 8 can be sterilized by different means than the thermocouple, shell, and conduit assembly.

In the embodiment shown in FIGS. 4 and 5, the casing 18 of heat conductive material is divided into halves which are secured to each other by securing strips 18a which engage projecting flanges 18b projecting from the edges of the casing halves. Alternatively, the casing halves can be joined along one edge by hinge means. About half of the interior of the casing 18 is filled with insulation 19, and positioned in the remainder of the interior is a generally semi-cylindrical shell 20 which divides the remainder of the interior of the casing into a space 21 within the shell 20 and a space 22 between the shell 20 and the casing 18. A valved opening 23 in the casing 18 is provided in order to supply a heat conducting fluid to the closed space 22. Mounted on the shell 20 is a plurality of thermocouples 24 of the same type as the thermocouples 11 in the embodiment of FIGS. 1–3, which are electrically connected in series. The thermocouples 24 are electrically connected to a source of direct current, such as a battery 25, which is mounted in the insulation 19 in the casing 18. Switch means (not shown) are provided for energizing the thermocouples when the capsule is to be used. The switch means can be such as to cause the direct current to flow in either direction through the series of thermocouples 24. Extending through the casing 18 into the space 21 within the shell 20 is an insulated outer conduit 26 having an inner conduit 27 within it. These conduits are for supplying a heat exchange fluid to the space within the shell 20. A quick disconnect coupling 28 is provided for the concentric conduits 26 and 27.

The capsule of FIGS. 4 and 5 is for use in treatment of only a portion of the periphery of a body conduit such as the conduit 2 of FIG. 1. In use, it is handled in the same way as the capsule of FIGS. 1–3, i.e. the space 22 is filled with a heat conductive medium through the opening 23 and the thermocouples 24 energized by actuation of the switch means for the battery 25 so as to heat or cool the casing 18, as desired. The capsule is inserted in the body conduit, cavity or the like, and then the heat exchange medium is circulated through the space 21 from the concentric conduits 26 and 27. When the treatment is complete, the capsule is removed in the same way as the capsule of the embodiment of FIGS. 1–3.

It will be understood that the insulation 19 need not fill just half the casing 18. It could fill more or less depending on the amount of the circumference of the body conduit it was desired to treat.

The embodiment of FIGS. 6 and 7 is somewhat similar in construction to that of FIGS. 2 and 3, but it has added to it a sheath of flexible material which is filled with a heat conductive material. As seen in FIGS. 6 and 7, the embodiment has an outer casing 31 of a heat conducting material, such as metal, which has a quick disconnect coupling 32 at the rear end thereof. Secured to the inside of the outer casing 31 adjacent the rear end is a closed end cylindrical shell 33 which projects into the interior of the casing 31 and which is preferably of a heat insulating material. Mounted in the shell 33 are a plurality of thermocouples 34 of the same type as the thermocouples 11 of the embodiment of FIGS. 2 and 3, which thermocouples are covered with an electrically resistant, heat transmitting insulation. The thermocouples are mounted in the shell 33 with one end inside the shell and the other end preferably abutting the inside surface of the outer casing 31. The thermocouples are electrically connected in series. With the shell 33 connected to the interior of the outer casing 31, the interior of the shell is separated from the exterior thereof, so that there is a closed space 35 within the shell 33 and a further closed space 36 between the shell 33 and the casing 31. A valved opening 37 in the casing 31 is provided in order to supply a heat conducting fluid to the closed space 36 if desired.

Extending from the quick disconnect coupling 32 into the interior of the shell 33 are a plurality of conduits 38, 39 and 40, the conduits 38 and 39 being conduits for conducting a heat transfer medium into and out of the space 35 within the shell 33, and the conduit 40 being a conduit for two wires which are connected to the thermocouples 34 for supplying current thereto. From the quick disconnect coupling 32, there extends a further conduit 41 within which the conduits 38, 39 and 40 extend from the capsule.

Secured to the outside of the casing 31 adjacent the coupling 32 is a flexible sheath 42 of a pliable, relatively good heat conducting material, such as polyvinyl chloride, which has a shape the outside periphery of which is greater than that of the casing 31. Within the sheath in the space between the sheath and the casing 31 is a heat conducting fluid 44. Valve 42a is provided in the sheath 42 to feed fluid into the sheath.

The use and operation of this embodiment is the same as that of FIGS. 2 and 3, except that it is especially designed for use in body cavities which would not be completely filled by the casing having a shape such as that of the embodiments of FIGS. 1–4, for example the uterus. The heat of the body is transmitted through the sheath 42, the heat conducting fluid 44, the outer casing 31 and the thermocouples 33. If the device is used for cooling, the heat will be transmitted in through the parts in the order as set forth above, while if the device is used for heating, the heat will be transmitted in the reverse order from that recited.

Figure 9:
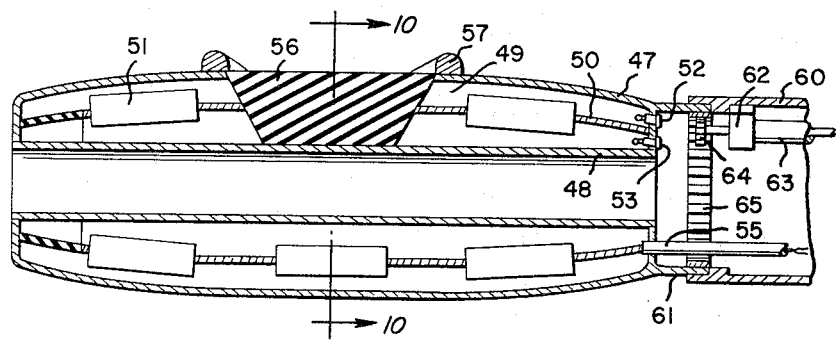
FIG. 9 is a sectional elevation view of the capsule of FIG. 8.
Figure 10:
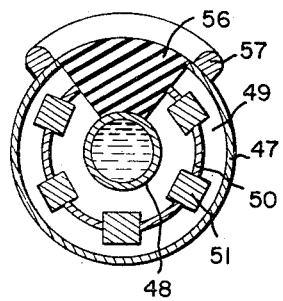
FIG. 10 is a sectional view taken on line 10—10 of FIG. 9.

The embodiment shown in FIGS. 8–10 is somewhat different from the previously described embodiments in that it is an annular cylindrical capsule designed to be used in a fluid conduit in a body, such as a blood vessel 45, through which a body fluid is flowing. The device is useful in the treatment of a portion of the conduit which is affected while permitting continued flow of the fluid through the conduit. In FIG. 10 the device is shown inserted in a blood vessel 45 which has an aneurysm 46 therein which is to be treated separately, the portion of the blood vessel 45 surrounding the aneurysm 46 being cooled and adhering or sticking to the wall of the device, while the flow of blood continues through the blood vessel. This adherance or sticking of the cooled wall of the device to the inner wall of the blood vessel insures that the device will stay in a fixed position and that there will be no seapage of blood or massive hemorrhage while the area of pathology is being surgically repaired or treated.

As clearly seen in the figures, the annular capsule has an outer casing 47 which is annular and generally cylindrical in shape and the ends of which are slightly curved inwardly toward the axis of the cylinder so as to make the ends of the cylinder somewhat blunt, and which ends are also open. Spaced inwardly of the outer casing 47 is an annular inner casing 48 which has the ends open and joined to the ends of the outer casing 47. The inner and outer casings define between them an annular cylindrical space 49 along which extends an annular cylindrical shell 50 of insulating material in which are mounted thermocouples 51 which are the same type as the thermocouples of the other embodiments described hereinbefore. In the embodiment as shown, the thermocouple ends terminate short of the inner and outer casings, but it is within the scope of the present invention to have them in contact with the inner and outer casings in the same manner as are the thermocouples of the embodiment of FIGS. 6 and 7. Where the thermocouples are as shown in the drawings, i.e. not in contact with the outer and inner casings, it is necessary to provide a heat conducting fluid in the spaces surrounding the thermocouples. Valved inlets 52 and 53 are provided, one for the space around the outer ends of the thermocouples and one for the space around the inner ends of the thermocouples. Extending from one end of the cyindrical casing is a conduit 55 which contains the wires for the thermocouples. As in the other embodiment, the thermocouples are electrically connected in series.

One portion 56 of the area of the outer casing 47 is an insulating material with the outer surface thereof recessed from the outer surface of the outer casing 47. Surrounding this portion of the outer casing is a raised lip 57 which is of the same material as the material of the outer casing.

In use, the annular cylindrical capsule casing is moved along the body conduit 45, such as a blood vessel, until the insulated surface portion 56 of the outer casing is opposite the affected portion 46 of the conduit. In this position the lip 57 is against the unaffected portion of the body conduit around the affected portion so as to substantially seal off this affected portion from the rest of the conduit so that it may be treated for example surgically. The thermocouples 51 are then energized, and if the direction of the current through them is such as to cool the outer ends and heat the inner ends, heat is conducted out of the wall of the body conduit 45, through the outer casing 47, the heat conducting fluid in the space 59, if any, through the thermocouple and through the inner casing 48. In this instance, the fluid flowing in the body conduit, for example blood, acts as the heat exchange fluid, carrying away the heat given up from the inner ends of the thermocouples 51. If the wall of the conduit 45 is to be heated, the heat is conducted out of the fluid flowing in the conduit and through the device in the opposite direction from that recited above.

It will thus be seen that the device according to this embodiment has a double function, that of sealing off an affected part of a body conduit and at the same time applying heat or cold to the portion of the conduit surrounding the affected part.

Since the insulated surface portion 56 extends only part of the way around the circumference of the casing 47, it is desirable to have as part of the probe apparatus a means for rotating the capsule within the body conduit. Such a means is provided in the form of a sleeve 60 within which an extension 61 of the outer casing 47 is rotatably mounted. Fixed on the inside of the sleeve 60 is a bearing member 62 in which the end of a flexible cable 63 is rotatably mounted, with the cable extending away from the sleeve 60 along the body conduit. On the end of the flexible cable is a gear 64 which meshes with an internal gear 65 within the extension 61 of the outer casing 47. At the other end of the cable is a motor (not shown) for rotating the flexible cable. The sleeve 60 must be sufficiently long that it is held fixed by the frictional engagement between it and the wall of the body conduit when the cable 63 is rotated, so that when the gear 64 is rotated by the cable, it will drive the internal gear 65 so as to rotate the capsule. This will enable the positioning of the insulated surface portion 56 at any desired rotational position.

The shape of the casing need not be as shown in the various embodiments. It can be changed depending on the part of the body to be treated. It can be elliptical or even relatively flat in cross section.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A capsule probe for supplying heat or cold to the viable tissue of the ducts, lumens and cavities of the body, comprising an outer substantially cylindrical casing of substantially rigid heat conducting material, a shell of insulating material within said outer casing and spaced therefrom, a plurality of thermocouples mounted in said shell and each having one end in operative relationship with said outer casing for transferring heat between said thermocouples and said outer casing, said thermocouples being of the type which when a direct current is passed through them get hot on one end and cold on the other end, said thermocouples being electrically connected in series, heat exchange medium conducting means in operative relationship with the other ends of the thermocouples for conducting a heat exchange medium in relation to the other ends of the thermocouples so as to transfer heat between the heat exchange medium and the thermocouples, and conduit means coupled to one of said thermocouples and having electricity conducting means therein for energizing the thermocouples.

2. A capsule probe as claimed in claim 1 in which said thermocouples have the one ends thereof spaced from said outer casing, and a heat conducting medium in the space between said shell and said outer casing for conducting heat between the thermocouples and the outer casing.

3. A capsule probe as claimed in claim 1 in which said thermocouples are in direct contact with the said outer casing.

4. A capsule probe as claimed in claim 1 in which said outer casing has one end closed and said shell has one end closed and has the other end attached to said outer casing at the other end thereof, and said heat exchange medium conducting means comprises a pair of conduits having their one ends opening into the interior of said shell and having the other ends adapted to be connected to a source of heat exchange medium.

5. A capsule probe as claimed in claim 1 in which said shell having one end closed and the other end attached to said closure member, said outer casing has one end closed and has an opening in the other end thereof opening into the interior of said shell, a closure member removably secured in said opening, A said heat exchange medium conducting means comprising a pair of conduits having their one ends opening into the interior of said shell through said closure member and having the other ends adapted to be connected to a source of heat exchange medium.

6. A capsule probe as claimed in claim 1 which further comprises a pliable sheath of heat conducting material and having an outside shape larger than that of the said outer casing, said sheath having one end attached to said casing adjacent one end thereof, and said sheath being filled with a heat conducting fluid.

7. A capsule probe as claimed in claim 1 in which said outer casing has both ends open, and said heat exchange medium conducting means comprises an annular inner casing of heat conducting material in heat conducting relationship with the other ends of said thermocouples and having the ends of said inner casing connected to the ends of the outer casing, said shell dividing the space between the inner and outer casings into two annular spaces, whereby heat exchange medium can be conducted through the interior of the inner shell for conducting heat to or away from the other ends of the thermocouples.

8. A capsule probe as claimed in claim 7 in which a portion of said outer casing is of insulating material, and said casing having a raised lip on the outside of the casing around said insulating material portion.

9. A capsule probe as claimed in claim 8 further comprising a means coupled to said outer casing for rotating said casing within a body conduit.

References Cited
UNITED STATES PATENTS

| | | | |
|---|---|---|---|
| 1,636,482 | 7/1927 | Newton | 128—303.12 |
| 2,190,383 | 2/1940 | Newman | 128—401 |
| 2,346,245 | 4/1944 | Zichlin | 128—401 |
| 3,088,288 | 5/1963 | Elfving | 128—400 X |
| 3,176,472 | 4/1965 | Cox | 62—3 |
| 3,238,944 | 3/1966 | Hirschhorn | 128—400 |
| 3,254,652 | 6/1966 | Smith et al. | 128—401 |

RICHARD A. GAUDET, *Primary Examiner.*

W. E. KAMM, *Assistant Examiner.*